(12) United States Patent
Takeo

(10) Patent No.: US 8,582,175 B2
(45) Date of Patent: Nov. 12, 2013

(54) IMAGE PROCESSING METHOD, IMAGE PROCESSING APPARATUS, IMAGE PROCESSING PROGRAM, AND PROGRAM STORING MEDIUM

(75) Inventor: Yasushi Takeo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 393 days.

(21) Appl. No.: 13/049,816

(22) Filed: Mar. 16, 2011

(65) Prior Publication Data

US 2011/0228300 A1 Sep. 22, 2011

(30) Foreign Application Priority Data

Mar. 17, 2010 (JP) ................................. 2010-061264

(51) Int. Cl.
*H04N 1/60* (2006.01)
(52) U.S. Cl.
USPC .............................. 358/1.9; 358/518; 358/529
(58) Field of Classification Search
USPC ........... 358/1.9, 3.27, 518, 529; 382/162, 167
See application file for complete search history.

(56) References Cited

U.S. PATENT DOCUMENTS

| | | | | |
|---|---|---|---|---|
| 5,999,703 A | * | 12/1999 | Schwartz et al. ............... | 358/1.9 |
| 2003/0133138 A1 | * | 7/2003 | Namikata ...................... | 358/1.9 |
| 2004/0119765 A1 | | 6/2004 | Fujimori et al. | |
| 2005/0105136 A1 | * | 5/2005 | Jung ............................... | 358/3.1 |
| 2005/0140997 A1 | * | 6/2005 | Shirasawa ....................... | 358/1.9 |
| 2005/0248665 A1 | * | 11/2005 | Morishita ..................... | 348/222.1 |
| 2006/0285137 A1 | * | 12/2006 | Namikata ...................... | 358/1.9 |
| 2007/0097161 A1 | | 5/2007 | Ejiri et al. | |
| 2007/0195343 A1 | * | 8/2007 | Yoneda .......................... | 358/1.9 |
| 2008/0072778 A1 | * | 3/2008 | Nagai et al. ..................... | 101/365 |
| 2008/0127846 A1 | * | 6/2008 | Nagai ........................... | 101/365 |
| 2009/0128838 A1 | * | 5/2009 | Yamamoto ..................... | 358/1.9 |
| 2011/0032373 A1 | * | 2/2011 | Forutanpour et al. ...... | 348/222.1 |

FOREIGN PATENT DOCUMENTS

| | | |
|---|---|---|
| CN | 1509234 A | 6/2004 |
| JP | 2006-247925 A | 9/2006 |
| JP | 2007-118490 A | 5/2007 |

\* cited by examiner

*Primary Examiner* — Kimberly A Williams
(74) *Attorney, Agent, or Firm* — Kilpatrick Townsend & Stockton LLP

(57) ABSTRACT

An image processing method causes a computer to execute calculating a reference ink use amount considering a black level of image data of an initial image as a reference level; calculating a relation between a correction value of each black level and the ink use amount from a state of using no ink to the reference level; calculating a proper correction value of the black level corresponding to a target ink use amount input by a user in the relation between each black level and the ink use amount; and generating image data of a correction image representing the initial image by the proper correction value and displaying the correction image on a display.

6 Claims, 10 Drawing Sheets

IMAGE PROCESSING METHOD, IMAGE PROCESSING APPARATUS, IMAGE PROCESSING PROGRAM, AND PROGRAM STORING MEDIUM

Priority is claimed under 35 U.S.C. §119 to Japanese Application No. 2010-061264 filed on Mar. 17, 2010, which is hereby incorporated by reference in its entirety.

BACKGROUND

1. Technical Field

The present invention relates to an image processing method for supporting a work of creating an image to be printed by a printing apparatus discontinuously ejecting ink on a medium to land the ink on a target position.

2. Related Art

An ink jet printer performing printing by discontinuously ejecting ink on various mediums such as paper, cloth, and film has been known as a printing apparatus. The ink jet printer arranges fine dots formed of ink droplets onto the medium to form an image. Such an ink jet printer is provided with a plurality of ink cartridges filled with ink of a plurality of colors and can perform printing with various colors. When replenishing ink, only the cartridge may be replaced. Accordingly, the ink jet printer is used to print, for example, a face of discount tickets (coupons) of products distributed on counters of stores.

Recently, the ink jet printer is used for immediate color printing of various kinds of coupons for purchased products, cooperating with to the known POS system in the store. For example, when a barcode of a specific product is read on the counter of the store, product information is transmitted to a definite-purpose printer through the POS system. The printer has stored in advance a correspondence between the product information transmitted from the POS system and a coupon to be printed, and the immediately prints and issues a predetermined coupon on the basis of the information transmitted from the POS system.

However, as a business model formed by the issuing service of the coupon, for example, in a case where a company B later produces and sells products similar to products produced by a company A, the company B issues an available coupon when a customer purchases the product of the company B for social publicity and sales promotion of the company B. The company B pays the expenses of the discount. When the customer purchases the product of the company A in the store, the coupon is issued. Accordingly, the company B can obtain the publicity for the fact that a similar product from a company other than the company A is provided, and through the money discounted by the coupon can motivate the customer to purchase the product of the company B.

In the business model, an advertisement agency relays between the store and the company B, a production and sales company of the issuing system of coupons, a maker selling a printer and the other hardware constituting the issuing system and supplies obtain profits.

For example, in the above-described business model, there are many cases where expenses for the supplies used in the printer are paid to the printer producing company according to the amount thereof used. Particularly, there are many cases where the expenses for ink are paid according to the use amount thereof. That is, for the ink jet printer, the expenses are not paid for the replacing ink cartridge, and the use amount is calculated by the number of ejections of ink to pay the expense according to the use amount. For this reason, no matter who pays the expenses for the ink, there is a desire to reduce the ink use amount as far as possible. A technique of managing the ink use amount is disclosed in JP-A-2007-118490.

However, a face of the coupon issued in the above-described business model needs to function as advertisement of the product from the viewpoint of product publicity. For this reason, the company B or the like, as the real issuing source of the coupon, has a desire to arouse a customer's interest by printing an image, on which a design designed by an image creator such as a professional designer is concentrated, on the face thereof. Accordingly, when blindly reducing the ink use amount, it is difficult to print with quality in which customers are interest. As a result, the advertisement effect may be decreased, the effect of issuing the coupons may disappear, and the business model may be not satisfied. Of course, it is not limited to the exemplified business model, and there are many reasons for reducing the ink use amount while minimizing the deterioration of image quality.

SUMMARY

An advantage of some aspects of the invention is to provide an image processing method, an image process supporting apparatus, and an image processing program, and a program storing medium that stores the program, which support a creator of an image to suppress deterioration of image quality to a minimum while reducing the ink use amount when the image printed by a printer is created. Another advantage will be clearly described below.

According to an aspect of the invention, there is provided an image processing method when creating an image in which a computer causes a printing apparatus forming an image to print using ink, the method including: calculating a reference ink use amount considering a black level of image data of an initial image as a reference level; calculating a relation between a correction value of each black level and the ink use amount from a state of using no ink to the reference level; calculating a proper correction value of the black level corresponding to a target ink use amount input by a user in the relation between each black level and the ink use amount; and generating image data of a correction image representing the initial image by the proper correction value and displaying the correction image on a display. Another aspect of the invention will be clarified by the specification and the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
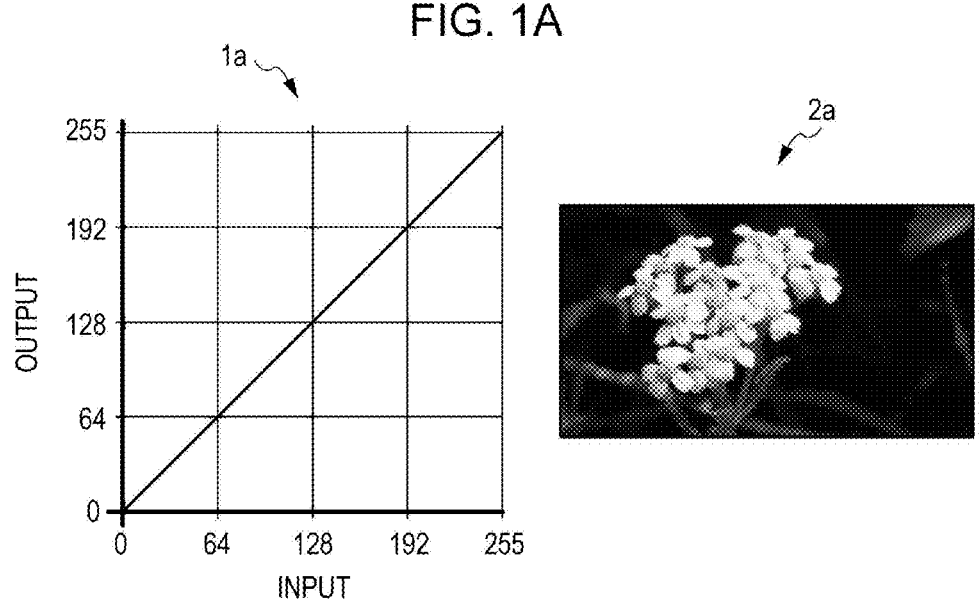
FIG. 1A and FIG. 1B are diagrams illustrating a black level correction value.

In the embodiment of the invention, for example, in the use of printing an image on the face of the coupon, it is assumed that an image (hereinafter, referred to as an original image) created by an image creator using image creating software installed in a computer is printed as it is, and it is necessary to reduce the ink use amount since the ink use amount is large. In this assumption, the embodiment of the invention is an image processing method for supporting a work of creating an image finally provided for printing for the user by using a computer, considering the ink use amount and deterioration of image quality.

The image created using the computer is bitmap image data in which tone values of RGB three primary colors are assigned to each pixel. The ink use amount necessary to print the image can be acquired through information processes of performing a color conversion process of converting the bitmap image data into a color system (e.g., CMY color system) in the printer and a halftone process of representing gradient by the number of dots per pixel and performing a dot count process of calculating the number of actually ejected ink droplets (ink use amount) thereon.

In a comparative example of the invention, using software calculating the ink use amount necessary to print the image by the information processes, the image creator first checks the ink use amount necessary to print the image for the original image. When the ink use amount is large, the image is corrected to reduce the ink use amount, for example, by increasing a white part where no ink is used or making a color tone dilute, and the ink use amount is checked again. Such a work is repeated to gradually reduce the ink use amount. A complex work taking a very long time is necessary to finally create an image provided for printing in consideration of the balance of a target ink use amount and deterioration of image quality.

Depending on the printer, there is a printer representing black by mixing a plurality of color inks using no black ink. In such a printer, for example, even when a black part of an image is merely changed into gray, it cannot be said that the ink use amount is necessarily reduced. That is, when a designer does not well understand ink ejection characteristics differing according to the kinds of printers, the ink use amount may not be reduced to the target ink use amount.

The embodiment of the invention is an image processing method for coping with various problems in consideration of a balance between reduction of the ink use amount and deterioration of image quality. In addition to the embodiment according to the main invention, the following characteristics are provided.

The calculating of the proper correction value includes:

calculating an intermediate ink use amount when the black level of the initial image is set to a predetermined intermediate value level;

calculating an approximate formula representing a relation between each black level and the ink use amount from a colorless black level of using no ink to the reference level on the basis of the reference use amount in the reference level and the intermediate use amount in the intermediate value level;

calculating a real ink use amount when the initial image is corrected by a temporary black level obtained by substituting the target ink use amount input by the user for the approximate formula;

specifying a correction black level most approximate to the target ink use amount by increasing or decreasing a value of the temporary black level when a difference between the target ink use amount and the real ink use amount is equal to or less than a predetermined value; and correcting the approximate formula on the basis of the temporary ink use amount at the time of setting the black level of the initial image to the value of the temporary black level and re-performing the calculating of the real image use amount on the basis of the approximate formula after correction, when the difference between the target ink use amount and the real ink use amount is larger than the predetermined value.

The computer stores an inter-conversion formula between the black level and the ink use amount for each kind of printer, accepts designation of the kind of printer input by a user, and calculates the ink use amount or the black level using the relational formula corresponding to the designated printer.

When there are a plurality of proper correction values corresponding to the target ink use amount, a correction value close to the reference level is employed.

When a user input for designating a specific partial area from the initial image is accepted, the partial area is excepted from a correction target of the black level.

In addition, the invention includes an image processing apparatus, and an embodiment according to the invention of the image processing apparatus has the following characteristics:

an image processing apparatus creating an image printed by a printing apparatus forming an image using ink, including:

an initial ink use amount calculating unit that calculates a reference ink use amount considering a black level of image data of an initial image;

an ink use amount calculating unit that calculates a relation between a correction value of each black level and the ink use amount from a state of using no ink to the reference level;

a proper correction value calculating unit that calculates a proper correction value of the black level corresponding to a target ink use amount input by a user in the relation between each black level and the ink use amount; and a correction image displaying unit that generates image data of a correction image representing the initial image by the proper correction value and displays the correction image on a display.

In addition, an image processing program and a storing medium of the program are included in the scope of the invention, the image processing program according to the embodiment of the invention is installed in a computer and is a program for causing the computer to create an image printed by a printing apparatus forming an image using ink, and causes the computer to execute:

calculating a reference ink use amount considering a black level of image data of an initial image;

calculating a relation between a correction value of each black level and the ink use amount from a state of using no ink to the reference level;

calculating a proper correction value of the black level corresponding to a target ink use amount input by a user in the relation between each black level and the ink use amount; and generating image data of a correction image representing the initial image by the proper correction value and displaying the correction image on a display. A medium storing the program is an embodiment of the program storing medium.

Principle of Image Processing Method

Figure 1B:
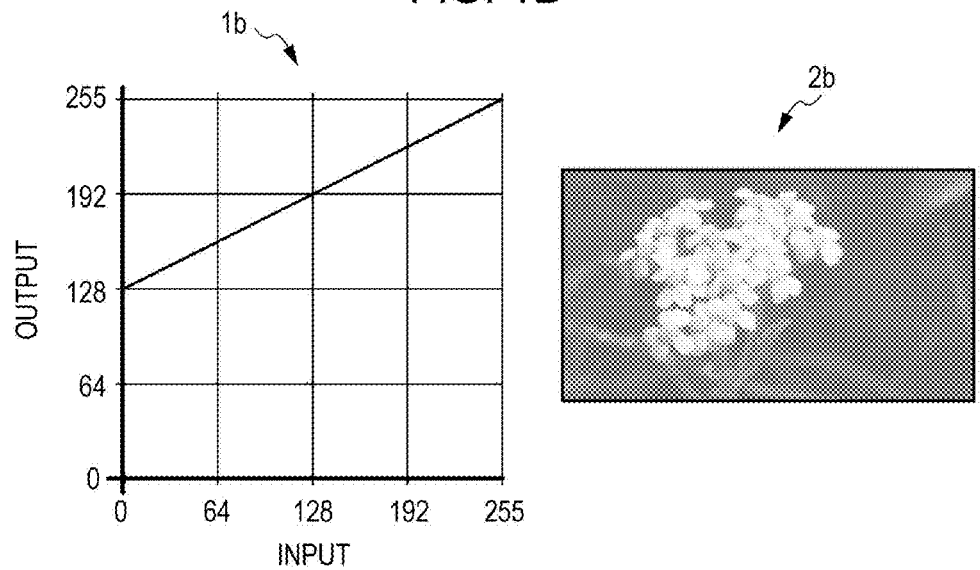

In an original image created by an image creator, it can be said that the color tone thereof is most important. Accordingly, it is preferable to reduce an ink use amount without changing the color tone. The most effective method of reducing the ink use amount while keeping the color tone is to correct a black level. FIG. 1A and FIG. 1B show a concept of correction of the black level. FIG. 1A is the black level before correction, and FIG. 1B is the black level after correction. For example, when a level is represented by 8 bits (256 black level value), as shown in the left graphs 1a and 1b of FIG. 1A and FIG. 1B, the 256 level is assigned to an input image and an output image. Generally, in the case of "black level correction", for an input image with gradient represented by a level of 0 to 255, the gradient of the output image is variable from a value between a level of 0 and a level of 255. FIG. 1A is a case where the black level correction is not corrected, and the gradient of the input and the output is represented by the same 256 level. That is, a variable setting value (hereinafter, referred to as a level correction value) of the black level of the output is 0, which is the darkest state. Accordingly, the gradient is represented by the level from 0 to 255, which is the most dilute (white state). On the right, the image (original image) 2a before correction is shown.

When the level of the original image 2a is changed to set the level correction value of the output to 128 as shown in Graph 1b of FIG. 1B, the gradient is represented from an initial 128 level to a 255 level. That is, the darkest level is gradient of the initial 128 level. Accordingly, the image 2b after correction is an overall dilute image as compared with the original image 2a. To print the image 2b after correction, ink necessary to represent the gradient of 0 to 127 level is not necessary, and it is possible to reliably reduce the ink use amount.

Figure 2:
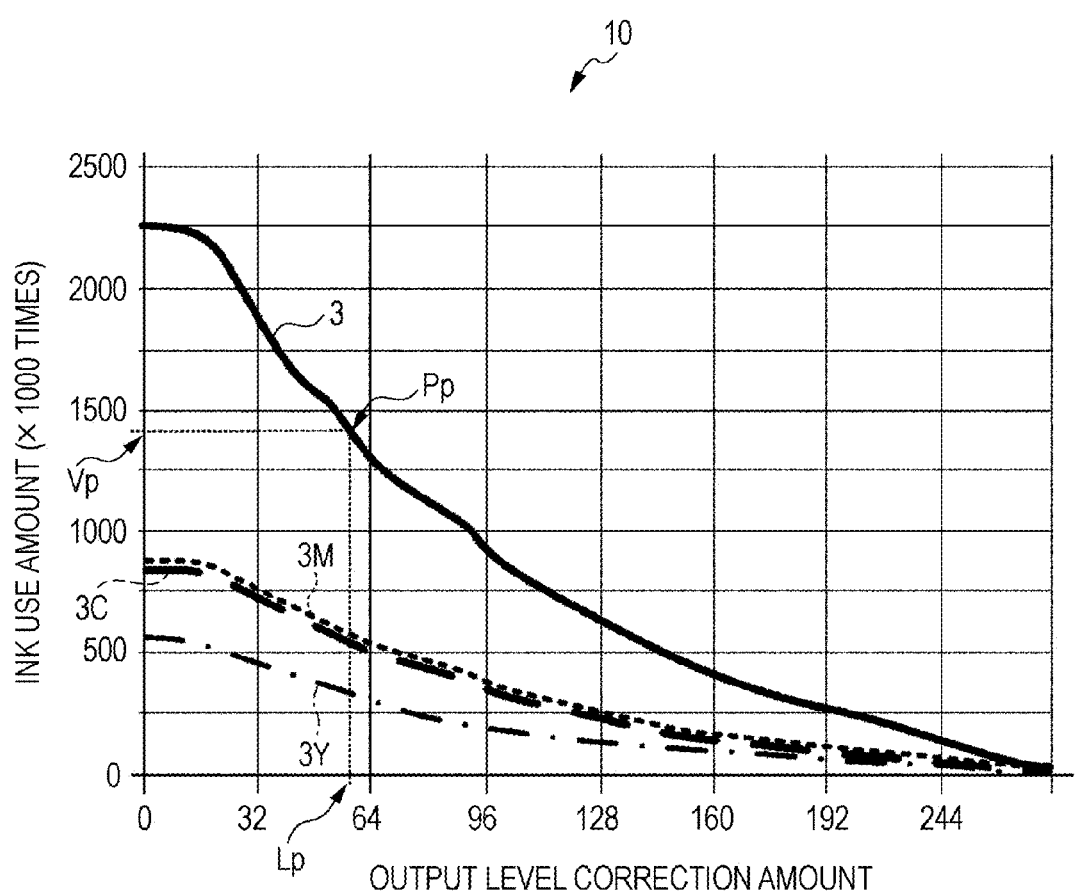
FIG. 2 is a diagram illustrating a relation between the black level correction value and the ink use amount.

FIG. 2 shows a relation between the level correction value and the ink use amount when performing the black level correction on any original image 2a by Graph 10. Herein, the relation between the level correction value and the ink use amount in the printer is represented using three colors of ink of C (cyan), M (Magenta), and Y (yellow). The horizontal axis is the level correction value of the output image, and the vertical axis is the ink use amount. Here, the ink use amount is regulated by the number of ink ejection times. Graph 10 shows a curve (hereinafter, referred to as an ink use amount curve) 3 representing a relation between the level correction value and the ink use amount of a 3-color system, and curves (3C, 3M, and 3Y) representing a relation between the level correction value and the ink use amounts of CMY colors.

When any target ink use amount Vp is designated, it is possible to obtain a proper level correction value (proper correction value) Lp corresponding to an intersection point Pp between the designated amount Vp and the total ink use amount curve 3. Since the level correction value is not a continuous numerical value, it is preferable that a level correction value most approximate to the target ink use amount Vp among level correction values less than the target ink use amount Vp is employed as the proper correction value, and the image obtained by correcting the original image by the correction value is printed.

Embodiments

An embodiment of the invention is realized by executing a program installed in a computer. The program (hereinafter, referred to as image processing software) causes the computer to perform a process of calculating an ink use amount from a bitmap data of an image to be printed, a process of correcting a black level of an image data, a process of displaying images before and after correction, and a process of calculating a proper correction value according to the target ink use amount.

Herein, the image creator cause a computer (hereinafter, an image processing apparatus) performing image processing software to process image data (initial image data) of an original image created by the image creator, a work sequence until the image creator to convert it into an image (correction image) for printing with the ink use amount approximate to the target ink use amount is exemplified, and a user interface environment or an information process in the image processing apparatus in the work is the embodiment of the invention.

Figure 3:
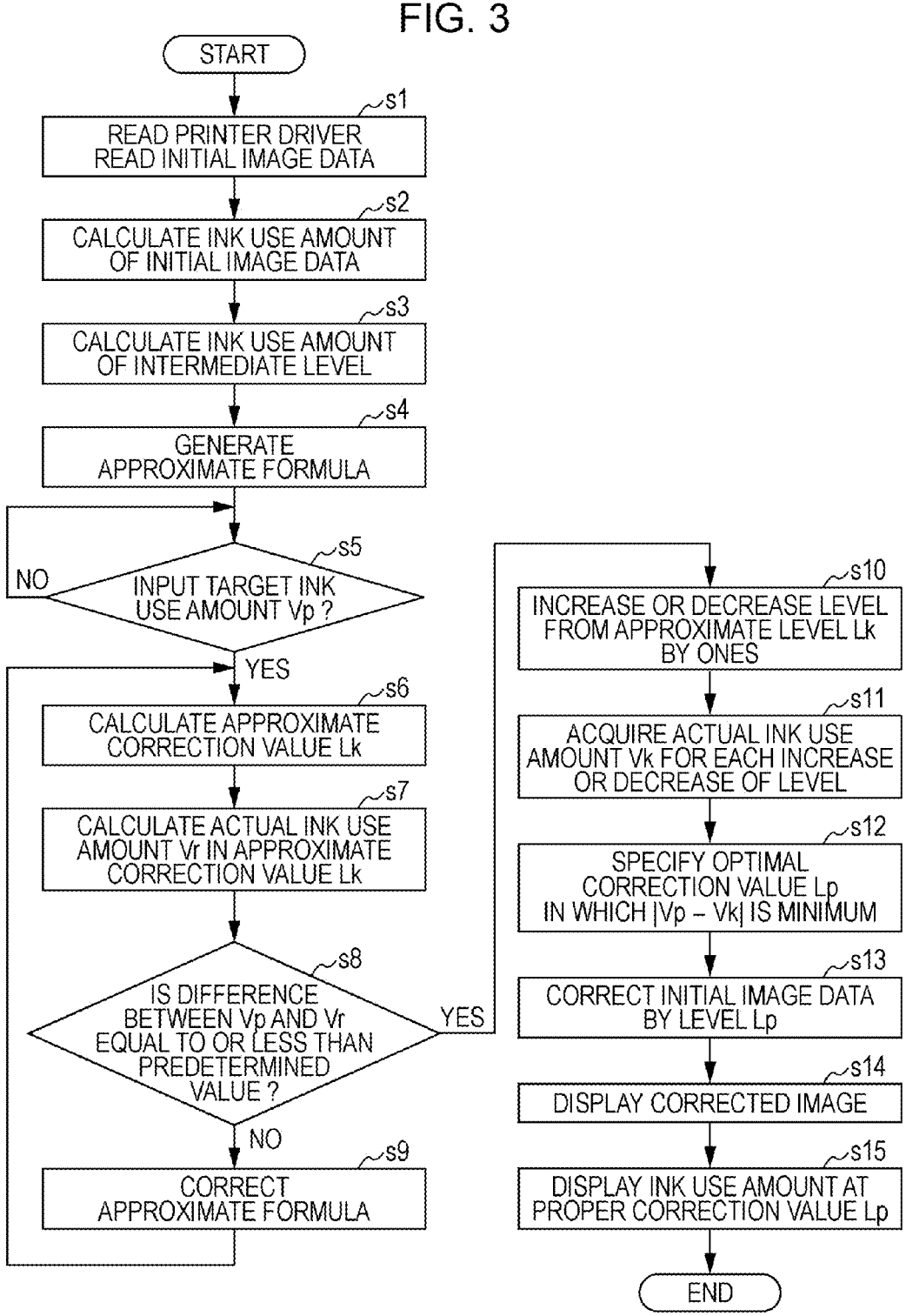
FIG. 3 is a flowchart illustrating an information process in an embodiment of the invention.
Figure 4:
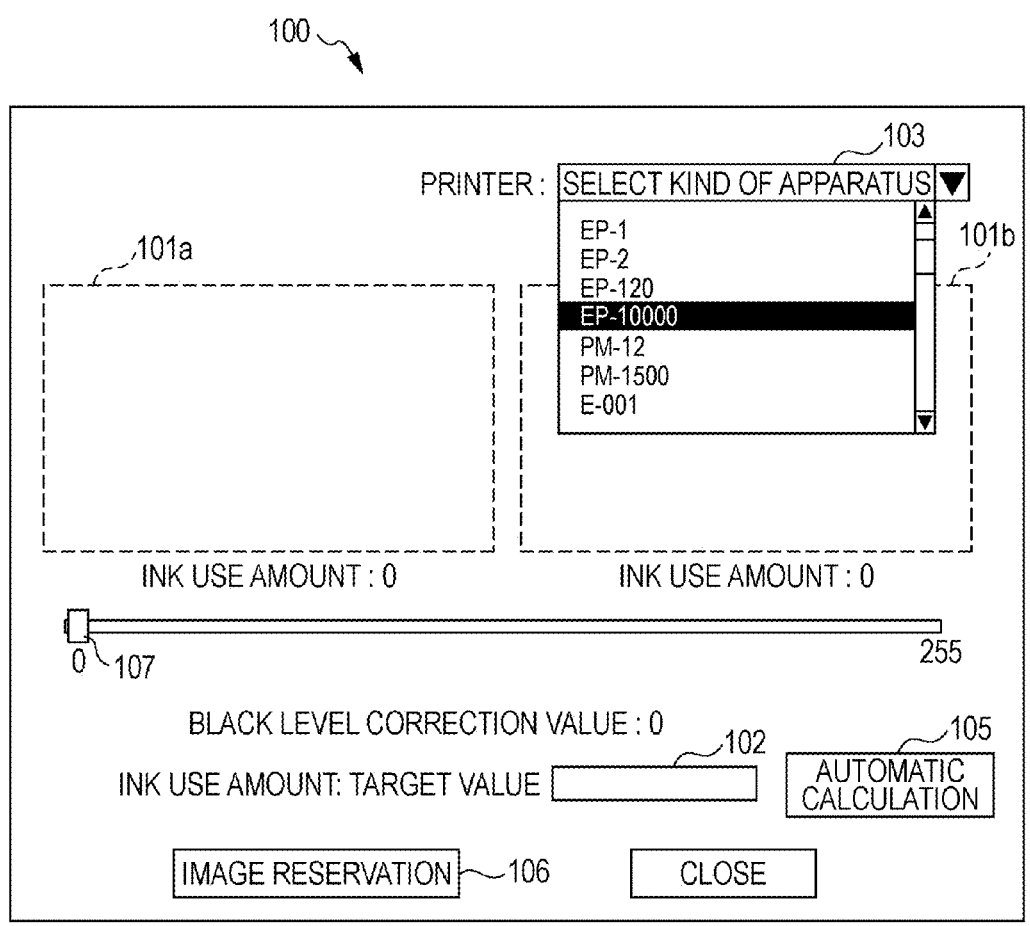
FIG. 4 is a diagram illustrating an example of an operation screen displayed on a computer in the course of the information process.
Figure 5:
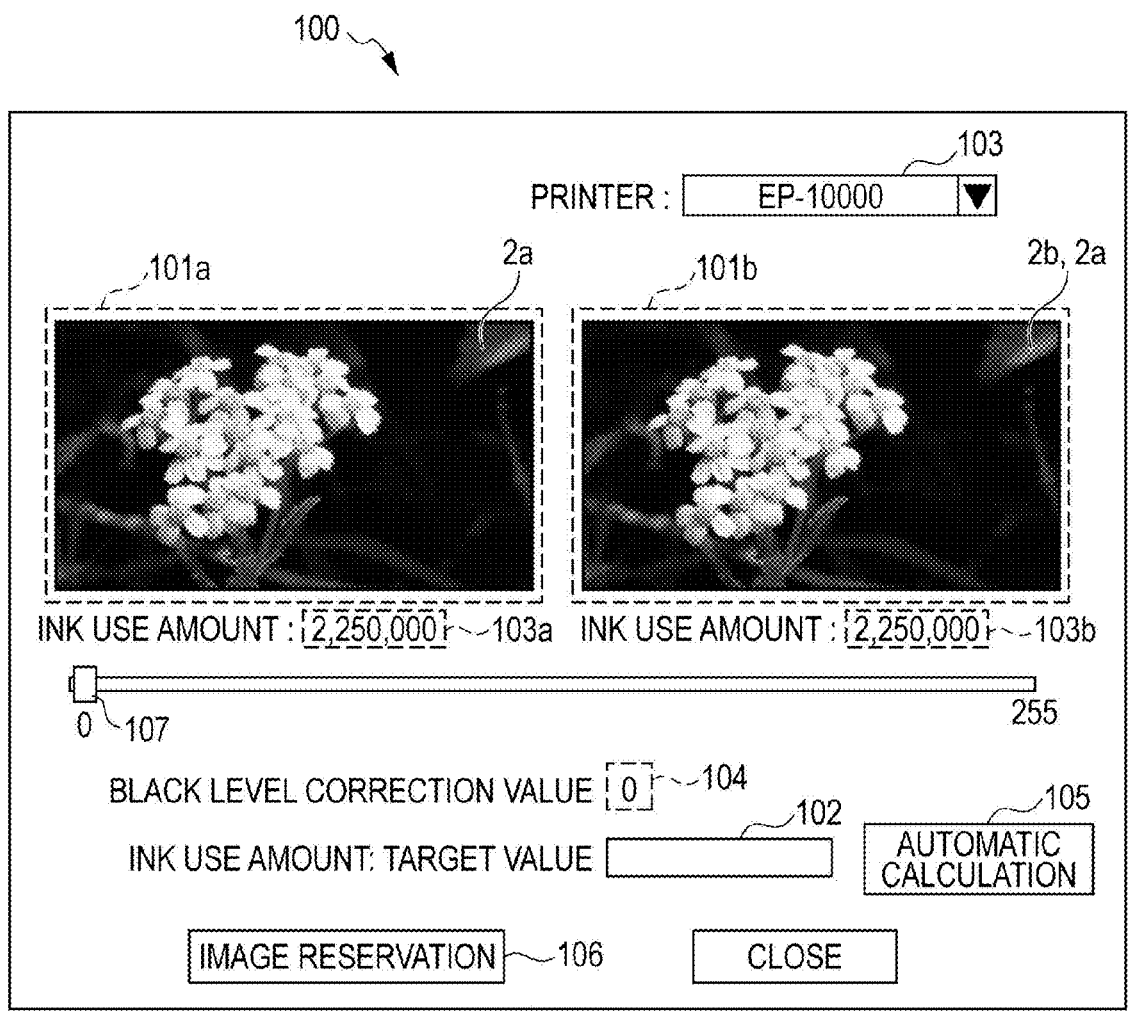
FIG. 5 is a diagram illustrating an example of a display state of the operation screen.
Figure 6:
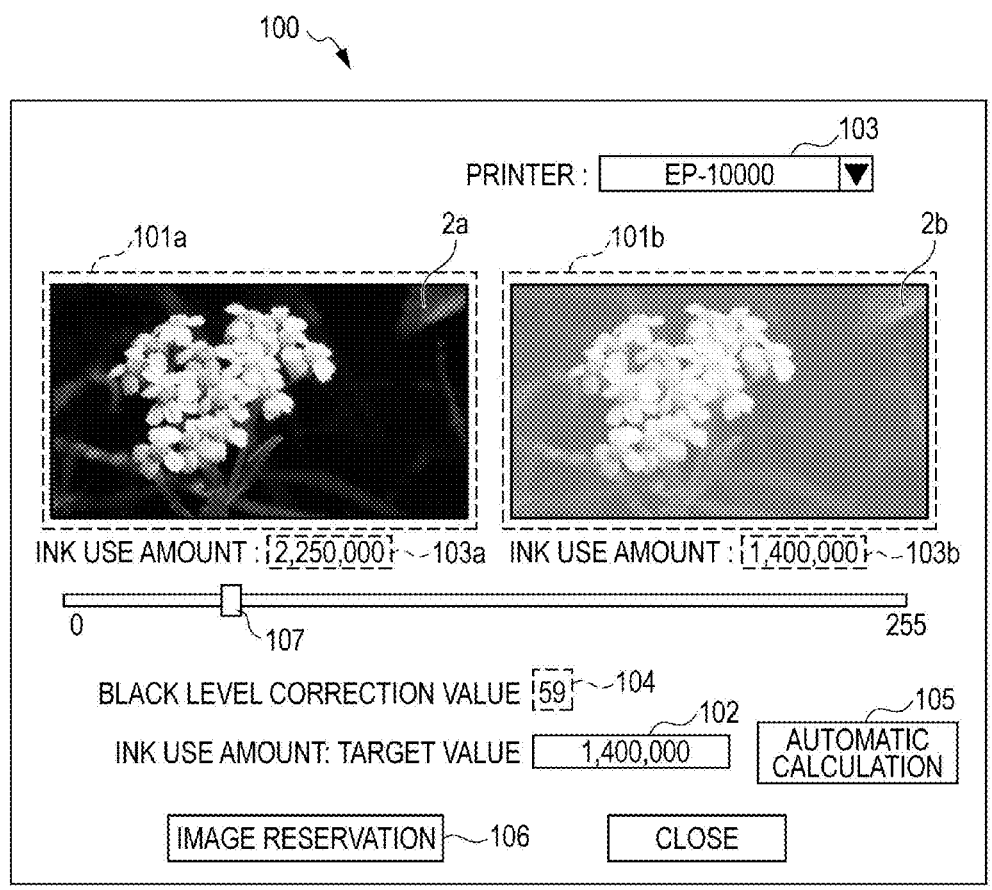
FIG. 6 is a diagram illustrating an example when the display state of the operation screen is changed.

FIG. 3 shows a flow of the information process performed by the computer. FIG. 4 to FIG. 6 show schematic diagrams of a screen displayed on a display of the computer in the course of the information process. Printer drivers corresponding to various kinds of printers are included as a module, and a function of performing the black level correction on the data (initial image data) of the original image to create an image after the correction is provided such as a program for use of general image processing called photo retouch software.

When the computer operates the image processing software by an operation input of a user such as a designer, a work screen 100 of the image processing software is displayed on a display as shown in FIG. 4. The work screen 100 includes areas 101a and 101b for displaying the images before and after correction, an input section 102 for the target ink use amount, a list-down box 103 for selecting an kind of printers, various buttons 105 and 106 for calculating a proper correction value or storing the image data after correction, and the like.

Figure 7:
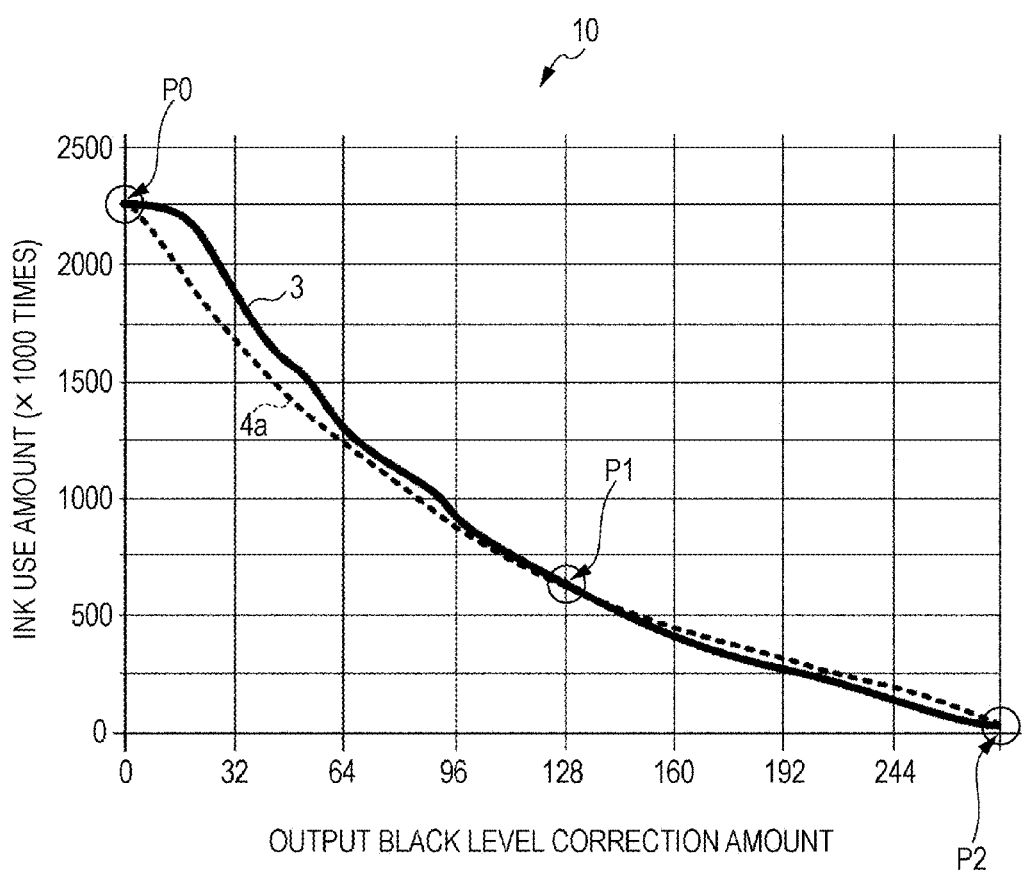
FIG. 7 is a diagram illustrating an approximate formula created in the course of the information process.

When the user selects a printer and designates a file of the initial image data, the image processing apparatus reads the corresponding printer driver and the initial image data and calculates the ink use amount when the initial image data is printed by the printer (s1 and s2). In the embodiment, the black level is handled by 8 bits and 256 levels. Then, the ink use amount with respect to the level correction value is calculated. In the embodiment, as shown in the ink use amount curve 3 in FIG. 2, first, the ink use amount is not calculated for all the level correction values, and the relation between the correction value and the ink use amount is acquired by the approximate formula, from three points of a position P0 of "0" that is the black level value of the initial image data, a position P1 of the intermediate black level correction value (e.g., 128 level), and a position P2 of 255 level using no ink in the ink use amount curve 3 (s3 and s4). The ink use amount curve 3 and the approximate curve 4a for all the level correction values showing a schematic diagram of the approximate formula in FIG. 7 have a slight error. However, as described above, when the approximate formula is used, process load of the image processing apparatus caused by calculating the ink use amount for all the level correction value is reduced, a process time is shortened, and thus efficiency of the work is improved.

Of course, the ink use amount of all the level correction values corresponding to the ink use amount curve 3 may be calculated in detail by using a high-performance computer having excellent processing ability or using a dedicated device causing a dedicated LSI to process various calculations as an aspect of the image processing apparatus.

When the image processing apparatus reads the initial image data, the image processing apparatus arranges the original image 2a before correction and the correction image 2b after correction of the black level on the left and right in the image display areas 101a and 101b before and after correction of the work screen 100, as shown in FIG. 5. Herein, since the black level is not corrected, the correction image 2b is substantially the same as the original image 2a. The ink use amount and the level correction value necessary to print the original image 2a and the correction image 2b are displayed on the display areas 103a, 103b, and 104. The ink use amount is displayed by the number of ink ejection times in the ink jet printer, and the level correction value can be intuitively known by a position of a slide bar 107 with a value thereof. At this time point, since the black level correction has not been performed yet, the level correction value is displayed by 0, and the slide bar 107 is located at the initial position of the left end.

Figure 8:
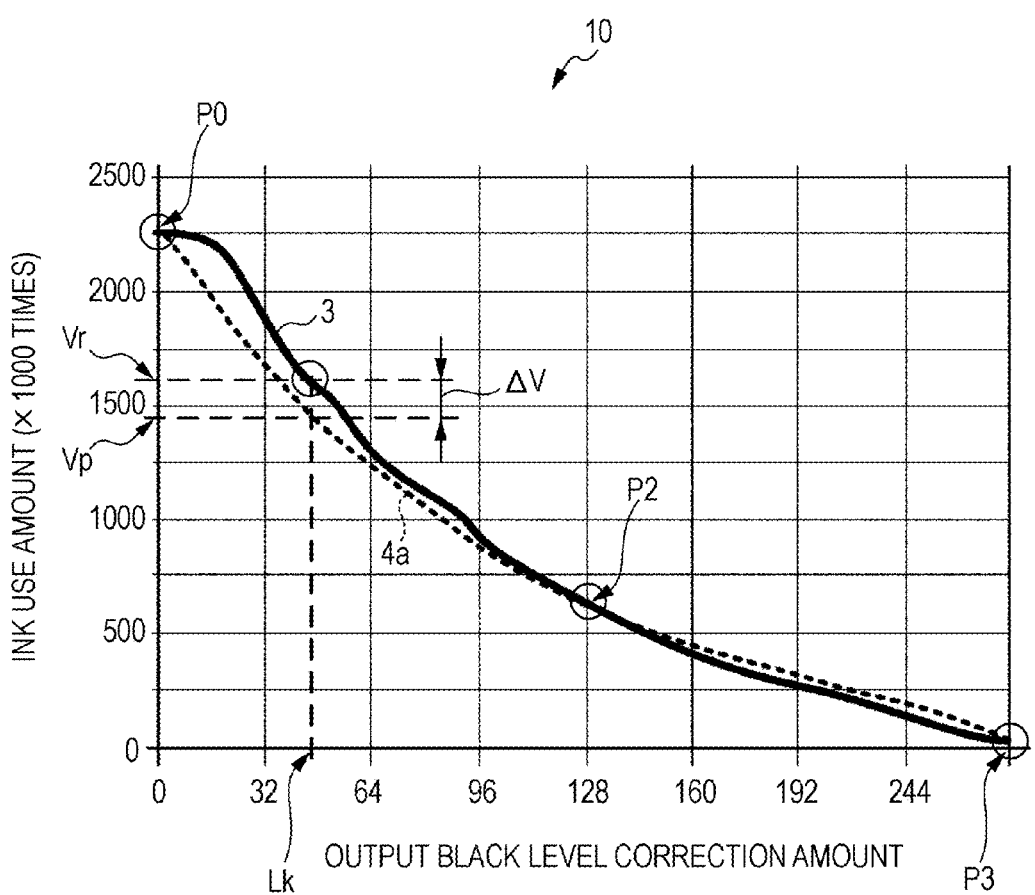
FIG. 8 is a diagram illustrating a sequence of the information process based on the approximate formula.

Then, the user inputs the target ink use amount Vp to the input section 102 on the work screen 100 to indicate an automatic calculation button 105, the image processing apparatus substitutes the target ink use amount Vp for the approximate formula as shown in FIG. 8, and calculates the most approximate level correction value (approximate correction value) Lk (s5→s6). A real ink use amount Vr in the approximate correction value Lk is calculated (s7). That is, the ink use amount on the ink use amount curve 3 is calculated. A difference $\Delta V$ between the real ink use amount Vr corresponding to the approximate correction value Lk acquired from the approximate formula and the target ink use amount Vp is calculated. When the difference is equal to or less than a predetermined value, scanning is performed while increasing or decreasing the level correction value by one level from the approximate correction value Lk, and a correction value that is the real ink use amount Vr closest to the target ink use amount Vp is specified as a proper correction value Lp (s8→s10 to s13).

Figure 9:
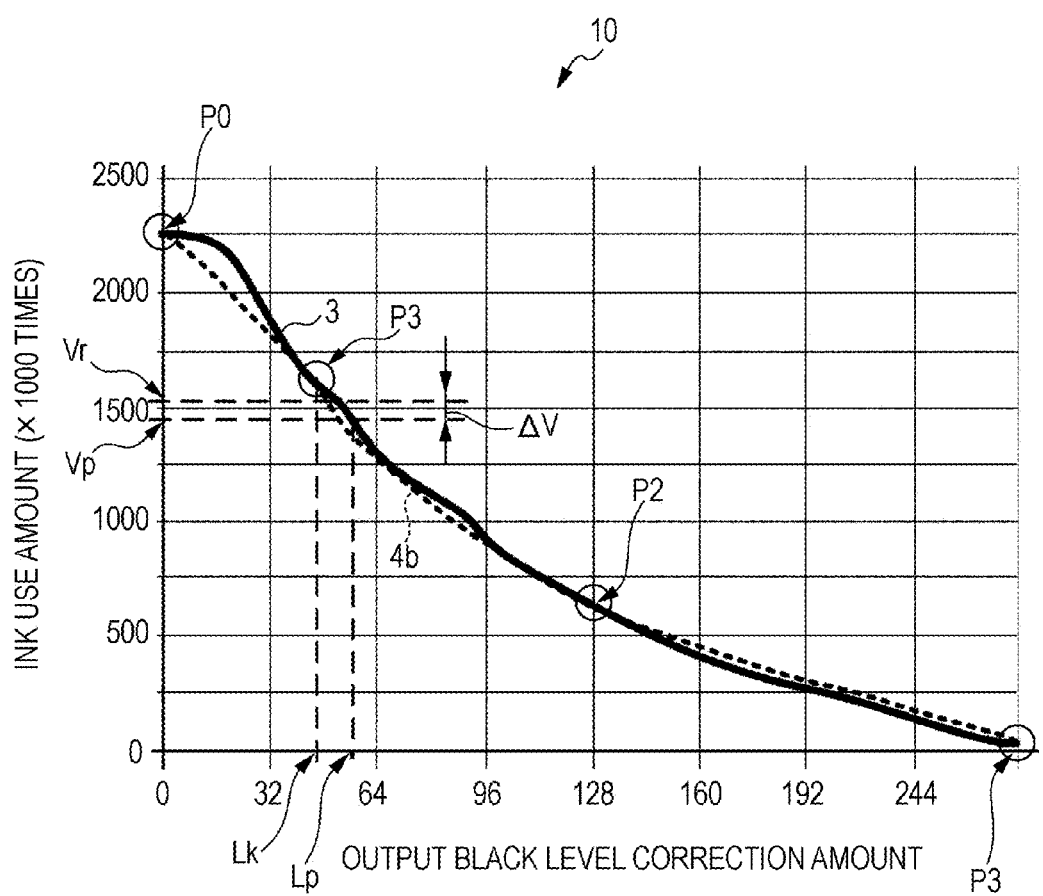
FIG. 9 is a diagram illustrating a correction process of the approximate formula.

When the difference $\Delta V$ is more than the predetermined value, the approximate formula 4a is corrected using the correspondence between the approximate correction value Lk and the real ink use amount Vr as shown in FIG. 9 (s8→s9). That is, the approximate formula is recreated from a position P3 of the approximate correction value Lk in addition to the 0-level position P0, the intermediate value (128 level) position P1, and the 255-level position P2 on the ink use amount curve 3. FIG. 9 shows an approximate curve 4b corresponding to the recreated approximate formula.

The target ink use amount Vp is substituted again for the approximate formula after the correction to calculate the approximate correction value Lk again (s6), and the real ink use amount Vr in the approximate correction value Lk is calculated (s7). This process is repeated until the difference $\Delta V$ is equal to or less than a predetermined value. At the time point when the difference $\Delta V$ is equal to or less than the predetermined value, the approximate correction value Lk is scanned by one level to specify the proper correction value Lp that is the ink use amount close to the target ink use amount Vp (s8→s9→s6 to s8→s10, s11, and s12).

When the proper correction value Lp is specified in such a manner, correction image data obtained by correcting the initial image data according to the proper correction value Lp is created (s13), the correction image 2b based on the correction image data is displayed on the display area 101b of the correction image in the work screen 10 of the image processing software as shown in FIG. 6, and the ink use amount at the proper correction value Lp is displayed on a predetermined area 103b of the operation screen 100 (s14 and s15). The specified proper correction value Lp is displayed at the display position 104, and the slide bar 107 is moved at a position corresponding to the level correction value Lp. The ink use amount 103b of the correction image 2b is displayed. The image processing software has a function of correcting the original image 2a by the level correction value, displaying the correction image 2b on the display area 101b, calculating the ink use amount, and displaying the ink use amount at the predetermined position 103b, when the slide bar 107 is moved left and right input by the user to set the level correction value.

Ink Use Amount Curve

Figure 10:
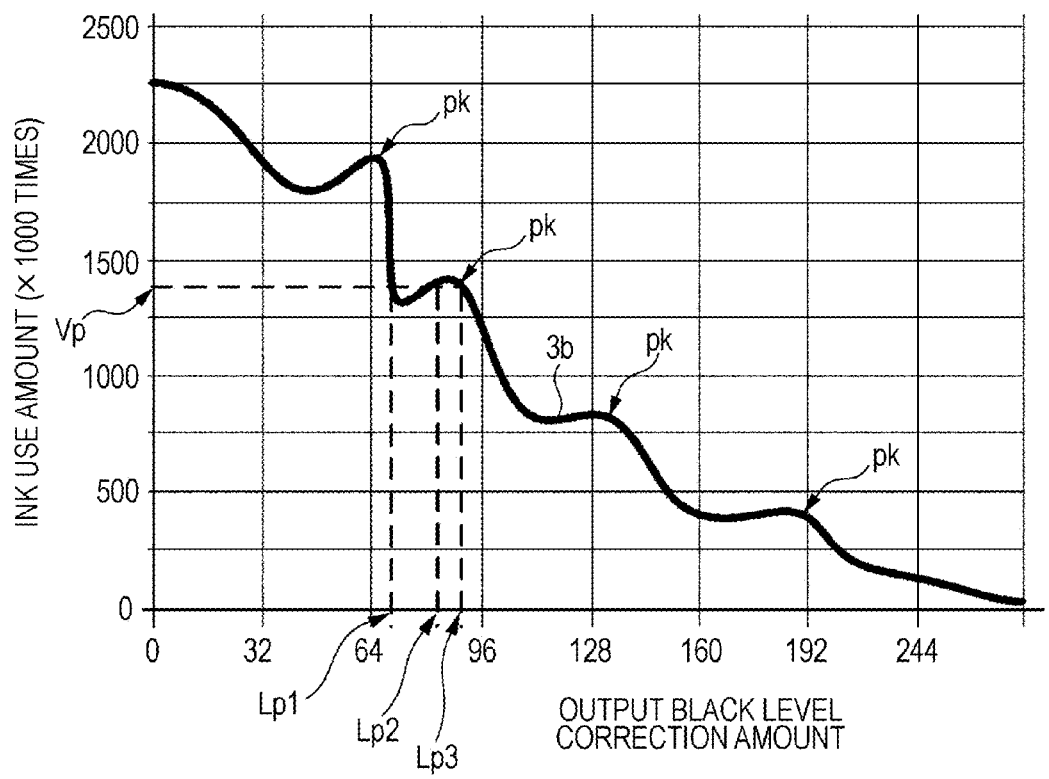
FIG. 10 is a diagram illustrating a relation between a black level correction value and an ink use amount in another embodiment of the invention.
Figure 11A:
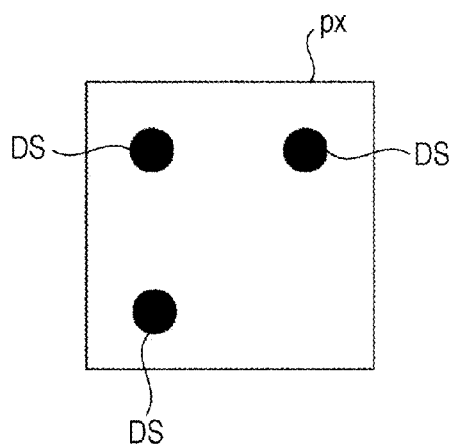
FIG. 11A and FIG. 11B is a diagram illustrating a specific example of another embodiment of the invention.
Figure 11B:
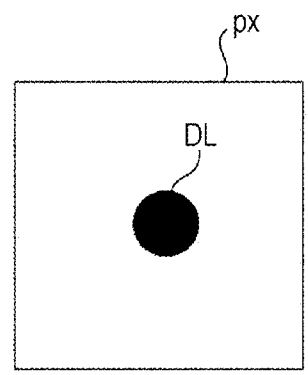

In the ink use amount curve 3 of the embodiment, the ink use amount is gradually decreased according to the increase of the level correction value. However, for example, according to kinds of printers, a plurality of dots with different sizes can be ejected, and the ink use amount curve 3 may be an ink use amount curve 3b of a form having a peak p as shown in FIG. 10. In such a case, there is a plurality of proper correction values (Lp1 to Lp3) for the target ink use amount Vp. Specifically, in a printer in which dots are classified into a small dot using ink of 1.5 pL ($10^{-12}$ liters) and a large dot using ink of 5 pL, between gradient represented by three small dots DS (4.5 pL) for one pixel px as shown in FIG. 11A and gradient represented by one large dot DL (5 pL) as shown in FIG. 11B, the gradient (B) represented by one large dot is more diluted. In such a case, with a priority on image quality, it is preferable to employ the level correction value Lp1 closer to the 0 level as the proper correction value.

Image for which Black Level Cannot be Corrected

When the embodiment of the invention is applied to the printing of the face of the coupon, an individual identifier may be assigned to each coupon and the identifier may be printed on the face by barcodes or the like, for example, to trace and check a use situation of the coupon. As is widely known, the gradient of barcodes is regulated by ISO to optically read the barcode in a reliable manner. For this reason, when the black level is corrected, the gradient of the barcode may not reach the regulated value. Thus, to print an image including a barcode, it is preferable that the black level of a part of the barcode is not corrected.

So as not to perform the black level correction of a part of the image, it is preferable to accept designation of an area other than the correction target and to perform the black level correction for other than the designated area in a user interface of the image processing software.

Other Embodiments

In the embodiment, the relation between the correction value of the black level and the ink use amount is acquired, and the level correction value is set to be closest to the target ink use amount. The invention is not limited thereto, the relation between the correction value and the ink use amount may be associated even in regard to a gamma characteristic or tone curve. When the target ink use amount is input, the correction value which may be closest to the use amount is employed, the original image is corrected, and the corrected image may be a printing target. For the gamma characteristic, a gamma value may be employed as the correction value. For the tone curve, for example, the ink use amount may be associated with organization of the input value and the output value of an inflection point of the known S-shaped curve.

In the embodiment, the image processing software (image processing program) is installed in the computer, but a definite-purpose device may be used. In addition, an image processing program downloaded through a network is one of the embodiments of the invention. Of course, the program storing medium that stores the image processing program is the embodiment of the invention.

The embodiments of the invention are not limited to the use of printing the face of the coupon, and may be applied to the use of printing an image with a target ink use amount.

The invention is applicable to, for example, the use of suppressing deterioration of image quality to a minimum to print an image while reducing the ink use amount. For example, the invention is applicable to a business model in which a store or the like pays for the ink use amount to print individual coupons according to products purchased on a counter.

What is claimed is:

1. An image processing method when creating an image in which a computer causes a printing apparatus forming an image to print using ink, the method comprising:
    calculating a reference ink use amount considering a black level of image data of an initial image as a reference level;
    calculating a relation between a correction value of each black level and the ink use amount from a state of using no ink to the reference level;
    calculating a proper correction value of the black level corresponding to a target ink use amount input by a user in the relation between each black level and the ink use amount; and
    generating image data of a correction image representing the initial image by the proper correction value and displaying the correction image on a display.

2. The image processing method according to claim 1, wherein the calculating of the proper correction value includes:
    calculating an intermediate ink use amount when the black level of the initial image is set to a predetermined intermediate value level;
    calculating an approximate formula representing a relation between each black level and the ink use amount from a colorless black level of using no ink to the reference level on the basis of the reference use amount in the reference level and the intermediate use amount in the intermediate value level;
    calculating a real ink use amount when the initial image is corrected by a temporary black level obtained by substituting the target ink use amount input by the user for the approximate formula;
    specifying a correction black level most approximate to the target ink use amount by increasing or decreasing a value of the temporary black level when a difference between the target ink use amount and the real ink use amount is equal to or less than a predetermined value; and
    correcting the approximate formula on the basis of the temporary ink use amount at the time of setting the black level of the initial image to the value of the temporary black level and re-performing the calculating of the real image use amount on the basis of the approximate formula after correction, when the difference between the target ink use amount and the real ink use amount is larger than the predetermined value.

3. The image processing method according to claim 1, wherein the computer stores an inter-conversion formula between the black level and the ink use amount for each kind of printers, accepts designation of the kind of printer input by a user, and calculates the ink use amount or the black level using the relational formula corresponding to the designated printer.

4. The image processing method according to claim 1, wherein when there is a plurality of proper correction values corresponding to the target ink use amount, a correction value close to the reference level is employed.

5. The image processing method according to claim 1, wherein when a user input for designating a specific partial area from the initial image is accepted, the partial area is excepted from a correction target of the black level.

6. An image processing apparatus creating an image printed by a printing apparatus forming an image using ink, comprising:
    an initial ink use amount calculating unit that calculates a reference ink use amount considering a black level of image data of an initial image as a reference level;
    an ink use amount calculating unit that calculates a relation between a correction value of each black level and the ink use amount from a state of using no ink to the reference level;
    a proper correction value calculating unit that calculates a proper correction value of the black level corresponding to a target ink use amount input by a user in the relation between each black level and the ink use amount; and
    a correction image displaying unit that generates image data of a correction image representing the initial image by the proper correction value and displays the correction image on a display.

* * * * *